United States Patent [19]

Cinti

[11] Patent Number: 5,215,830
[45] Date of Patent: Jun. 1, 1993

[54] METAL FIBER FOR REINFORCING CONCRETE

[75] Inventor: Raimondo Cinti, Bologna, Italy

[73] Assignee: ILM-IPS S.p.A., Rome, Italy

[21] Appl. No.: 757,851

[22] Filed: Sep. 11, 1991

[30] Foreign Application Priority Data

Sep. 12, 1990 [IT] Italy .................... 67683 A/90

[51] Int. Cl.$^5$ .................................... E04C 5/03
[52] U.S. Cl. .................... 428/606; 428/603; 106/644; 52/659
[58] Field of Search ........... 428/606, 603; 106/640, 106/641, 642, 643, 644; 52/659

[56] References Cited

U.S. PATENT DOCUMENTS

| 1,357,319 | 11/1920 | Hadaway | 428/603 |
| 2,677,955 | 5/1954 | Constantinesco | 106/644 |
| 3,942,955 | 3/1976 | Moens | 52/659 |
| 3,953,953 | 5/1976 | Marsden | 428/603 |
| 4,804,585 | 2/1989 | Tani et al. | 428/600 |
| 4,960,649 | 10/1990 | Takata et al. | 106/644 |

FOREIGN PATENT DOCUMENTS

| 0098825 | 1/1984 | European Pat. Off. . |
| 0105385 | 4/1984 | European Pat. Off. . |
| 2225392 | 8/1974 | France . |
| 2453958 | 7/1980 | France . |
| 59-150113 | 8/1984 | Japan | 428/603 |
| 1384688 | 3/1988 | U.S.S.R. | 428/606 |
| 1446855 | 8/1976 | United Kingdom . |

OTHER PUBLICATIONS

Dramix-Steel Fibers, "The Miracle in the Mix", Bekaert Steel Wire Corporation brochure, 5 pages.

*Primary Examiner*—John Zimmerman
*Attorney, Agent, or Firm*—Edward D. Manzo; David K. Lucente

[57] ABSTRACT

A fiber for reinforcing concrete comprises a length of metal wire having a substantially straight central part and offset anchoring parts at its opposite ends, each of which includes an initial straight portion parallel to the central part and offset laterally therefrom, a final straight portion coaxial with the central part, and two opposed oblique portions connecting the initial straight portion to the central part and to the final straight portion, respectively.

9 Claims, 4 Drawing Sheets

METAL FIBER FOR REINFORCING CONCRETE

FIELD OF THE INVENTION

The present invention relates to a fiber for reinforcing concrete, of the type comprising a length of metal wire with a substantially straight central part and offset anchoring parts at its opposite ends.

BACKGROUND OF THE INVENTION

Reinforcing fibers of this type are known, for example, from U.S. Pat. No. 3,900,667.

SUMMARY OF THE INVENTION

The object of the present invention is to provide a metal fiber of the type defined above which is particularly effective as regards its anchorage in the mass of concrete to be reinforced and is structurally very strong, but which at the same time is shaped so as to prevent problems of its hooking onto similar fibers as it is being mixed with the concrete A further object of the invention is to provide a metal fiber of the type defined above which can be produced easily and cheaply at fast production rates.

The reinforcing fiber according to the invention is characterised essentially in that each offset end part comprises an initial straight portion parallel to the central part but offset laterally therefrom, a final straight portion coaxial with the central part, and two opposed oblique portions connecting the initial straight portion to the central part and to the final straight portion, respectively Conveniently, the two initial straight portions of the two offset end parts are offset towards the same side of the central straight part of the fiber.

The length of the fiber according to the invention, which is made from drawn wire, may vary from 25 to 50 mm. The length is combined with a range of wire diameters according to the application of the concrete to which the fibers are added. Fibers with overall lengths of 25 mm are intended mainly for application by spraying ("spritz beton") and are formed from wire whose diameter is conveniently between 0.5 and 0.8 mm. Fibers with overall lengths of 50 mm are intended essentially for addition to concrete of a more consistent particle size for paving or casting and are formed from wire whose diameter is conveniently between 0.8 and 1.15 mm. The dimensions of the offset end anchoring parts are the same in both cases but the lengths of the straight central parts vary. The amount by which the offset end parts project laterally is proportional to the diameter of the wire constituting the fiber and hence to the particle size of the concrete mix constituting the basic matrix of the concrete to which the fibers are added.

The basic material for producing the fiber according to the invention is conveniently drawn, round, carbon-steel wire with a minimum tensile strength of 80 kg/mm$^2$.

A further subject of the invention is equipment for manufacturing the fibers, characterised in that it includes:

means for supplying a plurality of continuous parallel wires, a unit for entraining and forming the wires, including two opposed rotary rollers between which the wires are supplied along a calibrated path, the rollers having peripheral, axial grooves and projections, respectively, for shaping the wires, cutting means arranged beside the calibrated path downstream of the forming unit and including a plurality of blades projecting radially from a member which is rotatable about an axis parallel to and offset from the calibrated path, and means for rotating the entraining and forming rollers and the rotary cutting member in synchronism.

The invention will now be described in detail with reference to the appended drawings, provided purely by way of non-limiting example, in which:

DESCRIPTION OF THE PREFERRED EMBODIMENTS

Figure 1:
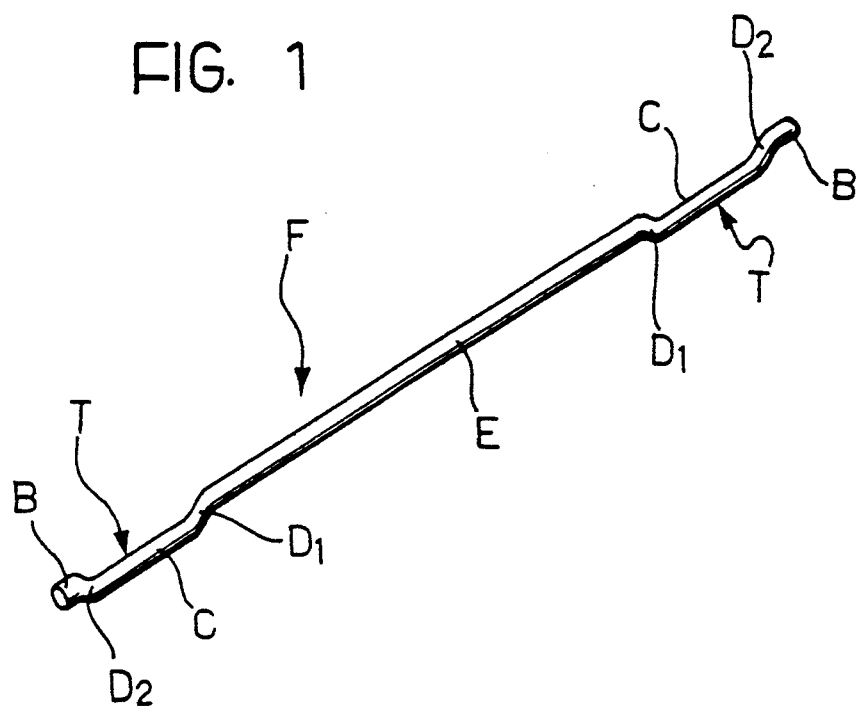
FIG. 1 is a schematic perspective view of a reinforcing fiber according to the invention.
Figure 2:
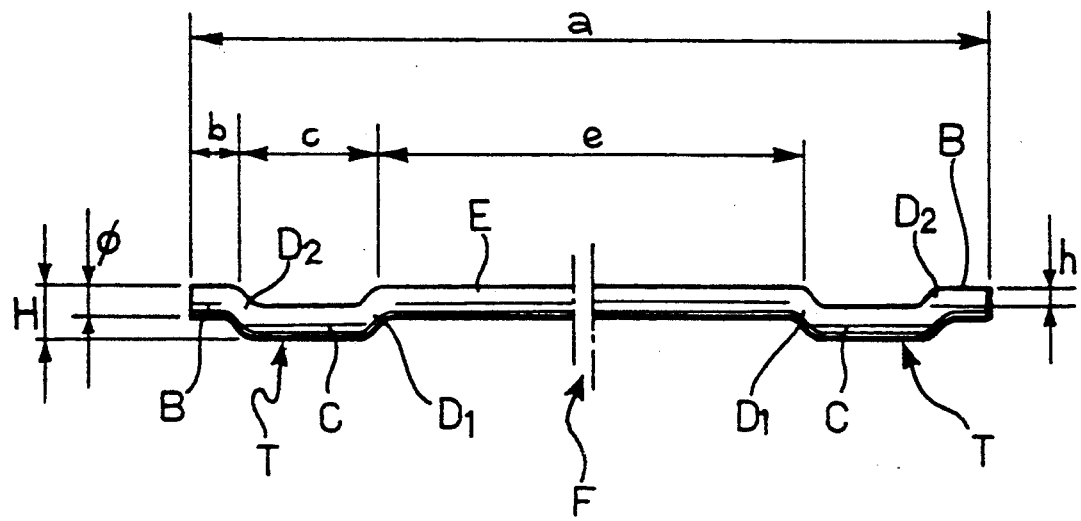
FIG. 2 is a side elevational view of the fiber.

With reference to FIGS. 1 and 2, a fiber according to the invention for reinforcing concrete is generally indicated F.

The fiber F is constituted by a length of drawn, round carbon-steel wire with a minimum tensile strength of 80 kg/mm$^2$, having a particular shape which is adapted to afford it a more effective anchorage in the concrete.

In detail, the fiber F has a substantially straight central part E and two opposite, offset anchoring end parts T.

Each of the two offset ends T is constituted by a straight portion C parallel to the central part E and offset laterally therefrom, a final straight portion B coaxial with the central part E, and two opposed oblique portions $D_1$, $D_2$ connecting the initial straight portion C to the central part E and to the final straight portion B, respectively.

The two initial straight portions C of the two end parts T are offset towards the same side of the central straight part E: in other words, the two end parts T project from the same side of the fiber F.

The table below gives the optimum dimensional parameters found experimentally by the Applicant for the fiber F. With reference to FIG. 2, the following dimensions are indicated in the table:

0 = the diameter of the wire
a = the overall length of the fiber F
b = the length of each final straight portion B
c = the length of each initial straight portion C and its oblique connecting portions $D_1$ and $D_2$
e = the length of the central straight part E
h = the lateral offset of each initial straight portion C from the central part E H = the width of the fiber F in correspondence with its offset end parts T

| ⌀ mm | a mm | b mm | c mm | e mm | h mm | H mm |
|---|---|---|---|---|---|---|
| 0.5–0.8 | 24.659 | 1.5 | 4 | 13.659 | 0.5 | 1 |
| 0.8–1.15 | 49.319 | 1.5 | 4 | 38.318 | 0.5 | 1.3 |

Tolerances:
⌀ +/− 0.03
a +/− 0.02

The fiber F with a diameter of between 0.5 and 0.8 mm and an overall length of about 25 mm is intended mainly for spraying applications, whilst that with a diameter of between 0.8 and 1.15 mm and an overall length of about 50 mm is intended for addition to concrete with a more consistent particle size.

The ways in which the fibers according to the invention is used for reinforcing concrete (the mixing methods, the aspect ratio, the number of fibers per unit volume) are conventional.

Figure 3:
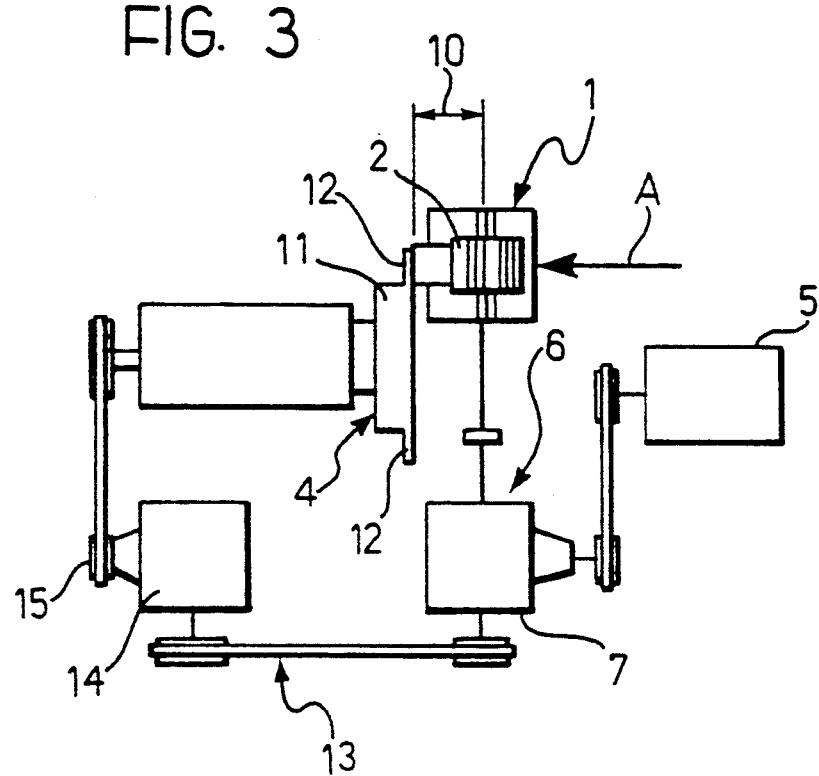
FIG. 3 is a schematic plan view of equipment for manufacturing the fiber.

In order to produce the fiber F, the invention provides for equipment whose essential components are shown schematically in FIG. 3. The equipment includes a unit 1 for entraining and forming the wire, constituted by a pair of opposed rollers 2 (FIGS. 4–6) and 3 (FIGS. 7–9) with parallel axes, and a cutting device 4 arranged downstream of the unit 1.

The unit 1 is supplied with a plurality of parallel wires produced in a conventional manner and collected in suitable intermediate bundles so as to ensure a continuous supply to the machine in the direction indicated by the arrow A in FIG. 3. The two entraining and forming rollers 2, 3 are rotatable about respective axes perpendicular to the direction of supply A and are rotated by a motor 5 and a transmission, generally indicated 6, including an intermediate angle gear 7.

Figure 6:
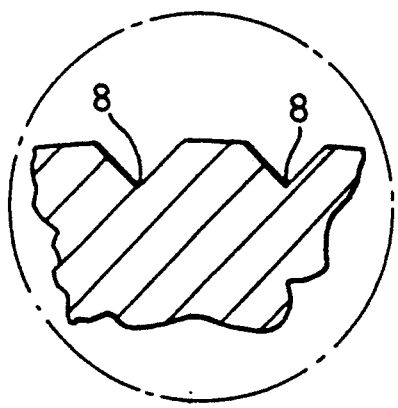
FIG. 6 is a sectional view of the detail indicated by the arrow VI in FIG. 4.
Figure 5:
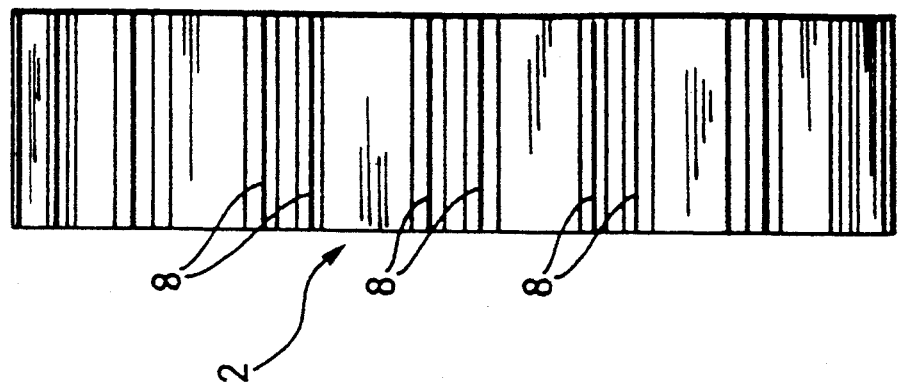
FIG. 5 is a front elevational view taken on the arrow V of FIG. 4, on an enlarged scale.
Figure 4:
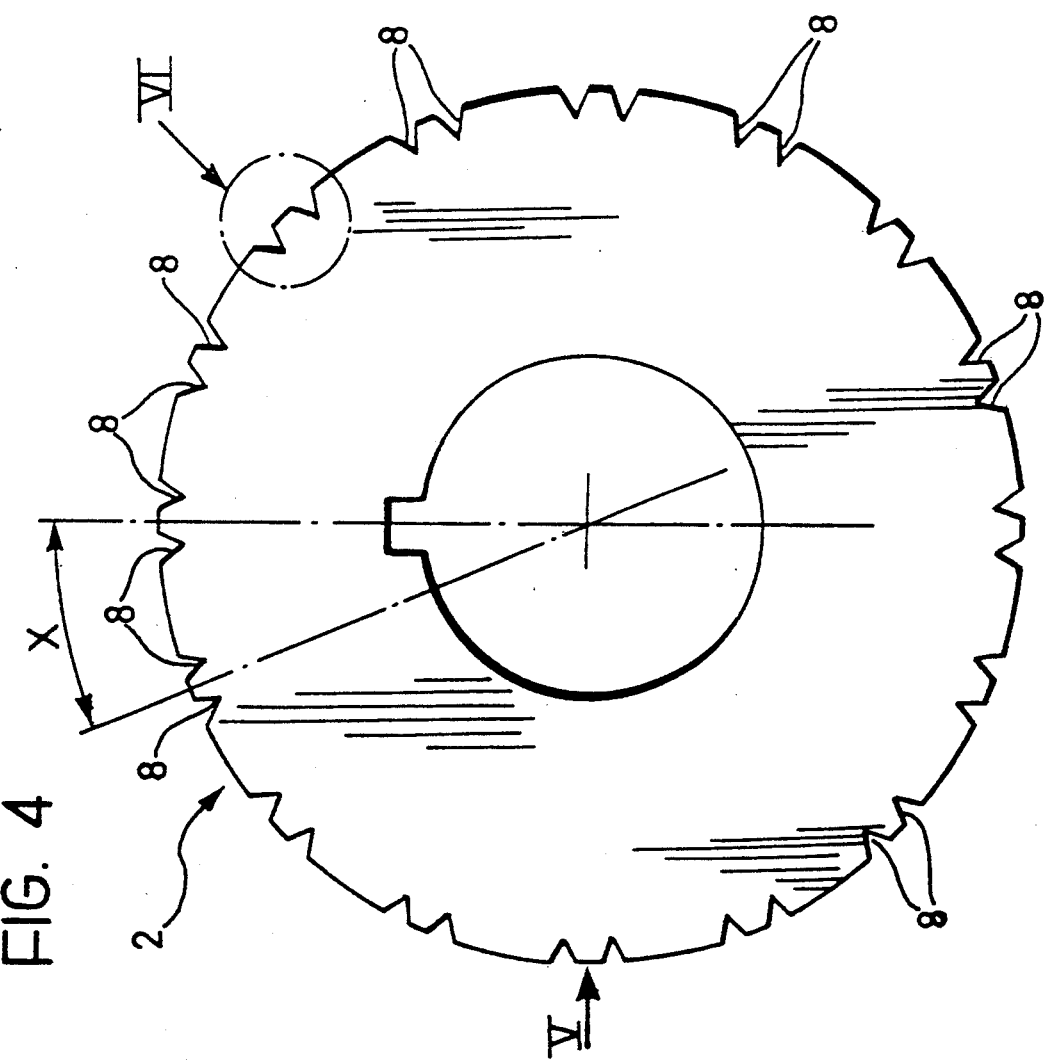
FIG. 4 is a side elevational view of a first component of the equipment of FIG. 1, on an enlarged scale.

With reference in greater detail to FIGS. 4 to 6, the upper roller 2 has a series of pairs of adjacent axial grooves 8 with substantially V-shaped cross-sections on its periphery. The peripheral regions of the roller 2 between the central portions of each set of adjacent grooves 8 subtend angles indicated X in FIG. 4 and constitute the dies for the wires supplied to the unit 1. In order to produce fibers F whose lengths a are 24.659 mm, the angle X is 22.5°. In order to produce fibers F with lengths of 49.319 mm, the angle X is 45°. The outside diameter of the roller 2 is 125.651 mm.

Figure 9:
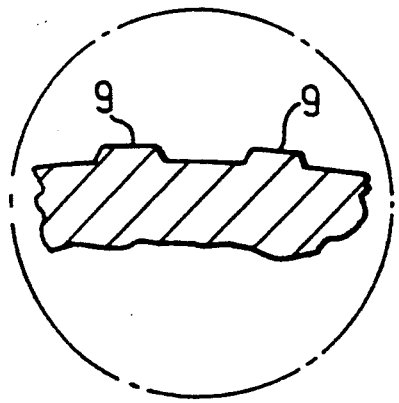
FIG. 9 is a sectional view of the detail indicated by the arrow IX in FIG. 7, on an enlarged scale.
Figure 8:
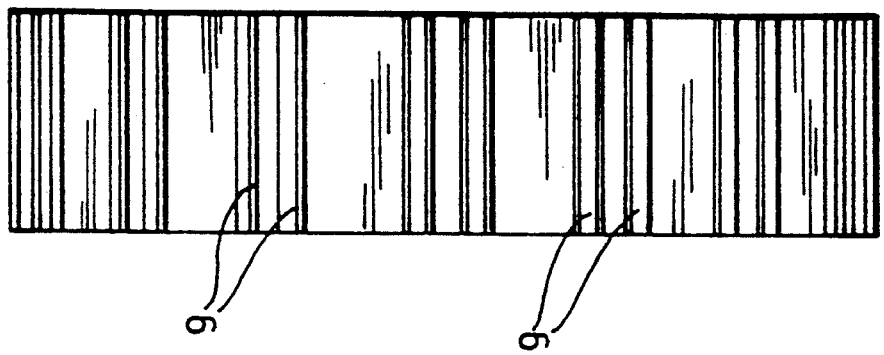
FIG. 8 is a front elevational view taken on the arrow VIII of FIG. 7.
Figure 7:
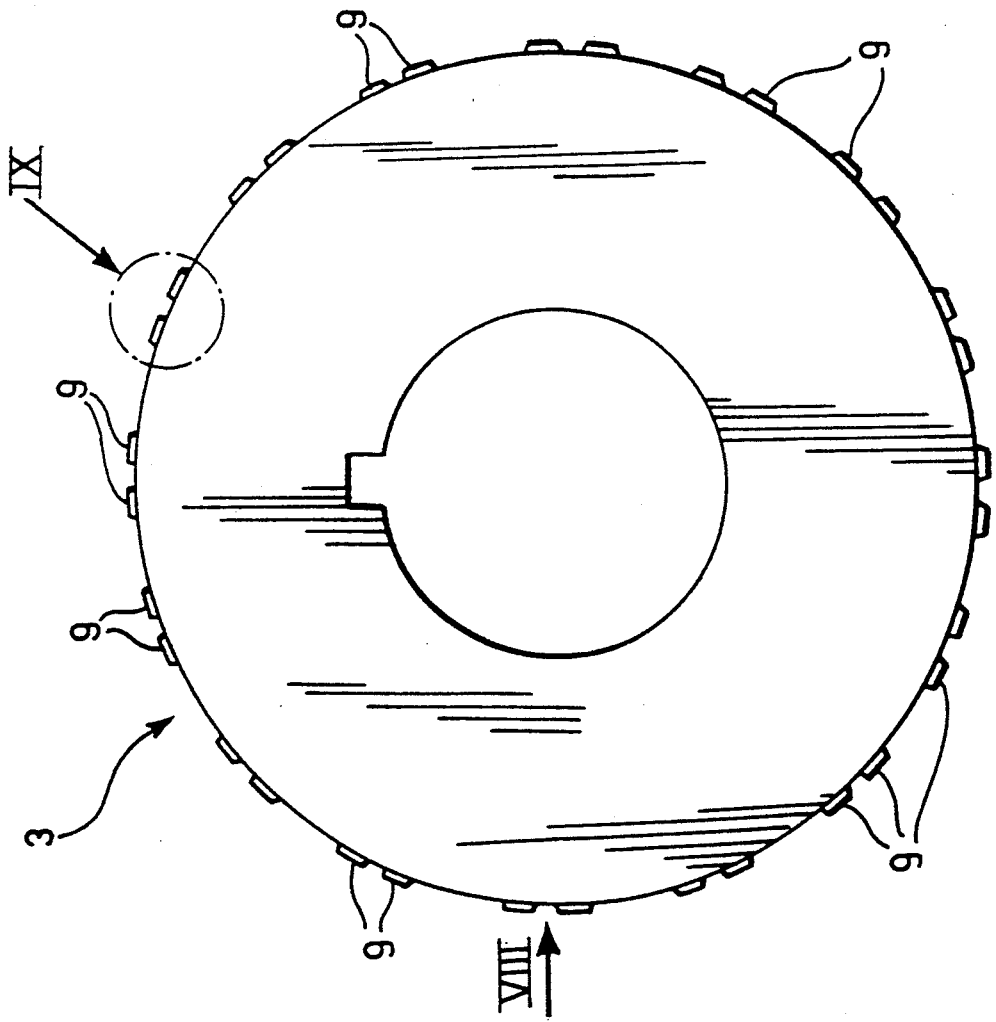
FIG. 7 is a side elevational view of a second component of the equipment of FIG. 3, on an enlarged scale.

The lower roller 3, which is shown in greater detail in FIGS. 7 to 9, has corresponding pairs of axial projections 9 on its periphery. In practice, the projections 9 act as punches cooperating with the dies 8 of the upper roller 2 and are arranged at the same angular spacing as the latter: the angular spacings X of the central regions of the pairs of adjacent projections 9 correspond to those given above with reference to the roller 2, as does the outside diameter.

The wires supplied in the direction A are entrained and formed by the rollers 2, 3 of the unit 1 along a calibrated path, indicated 10 in FIG. 3, at the end of which the cutting device 4 is arranged. This device comprises a disc 11 which is rotatable about an axis parallel to and offset laterally from the path 10 and to which equiangularly-spaced radial blades 12 are fitted.

There are eight blades 12 for forming fibers F 24.659 mm long and four for forming fibers f 49.319 mm long.

The disc 4 is rotated by the motor 5 through a transmission, generally indicated 13, also including an intermediate angle gear unit 14 with which a synchronising device, schematically indicated 15, is associated. The synchronising device, whose configuration is within the capabilities of an expert in the art, has the function of ensuring that the rollers 2, 3 of the station 1 and the blades 12 of the cutting device 4 are in phase angularly.

In operation, the fibers F are formed and cut continuously and are then collected by a conveyor unit, not shown, located beneath the cutting device 4 for automatically boxing the fibers in dependence on the speed of operation of the equipment.

Naturally, the details of construction and forms of embodiment may be varied widely with respect to those described and illustrated, without thereby departing from the scope of the present invention.

I claim:

1. A fiber for reinforcing concrete, comprising a length of metal wire with a substantially straight central part and offset anchoring parts at opposite ends, wherein each offset end part comprises an initial straight portion parallel to the central part but offset laterally therefrom, a final straight portion coaxial with the central part, and two opposed oblique portions connecting the initial straight portion to the central part and to the final straight portion respectively.

2. A fiber according to claim 1, wherein the initial straight portions of the two offset end parts are offset towards the same side of the straight central part of the fiber.

3. A fiber according to claim 1 wherein:
   the wire has a constant circular cross-section with a diameter between 0.5 and 0.8 mm +/− 0.03;
   the overall length of the fiber is substantially 25 mm +/− 0.02;
   the length of the central straight part is between 13 and 14 mm;
   the length of each final straight portion is substantially 1.5 mm;
   the length of each initial straight portion with its oblique connecting portions is substantially 4 mm;
   the width of the fiber measured in correspondence with its offset end parts is substantially 1 mm; and
   the lateral offset of the initial straight portions from the central part is substantially 0.5 mm.

4. A fiber according to claim 2 wherein:
   the wire has a constant circular cross-section with a diameter of between 0.5 and 0.8 mm +/− 0.03;
   the overall length of the fiber is substantially 25 mm +/− 0.02;
   the length of the central straight part is between 13 and 14 mm;
   the length of each final straight portion is substantially 1.5 mm;
   the length of each initial straight portion with its oblique connecting portions is substantially 4 mm;
   the width of the fiber measured in correspondence with its offset end parts is substantially 1 mm; and
   the lateral offset of the initial straight portions from the central part is substantially 0.5 mm.

5. A fiber according to claim 1 wherein:
   the wire has a constant circular cross-section with a diameter of between 0.8 and 0.15 mm +/− 0.03;
   the overall length of the fiber is substantially 50 mm +/− 0.02;
   the length of the straight central part is between 38 and 39 mm;
   the length of each final straight portion is substantially 1.5 mm;

the length of each initial straight portion with its oblique connecting portions is substantially 4 mm;

the width of the fiber measured in correspondence with its offset end parts is substantially 1.3 mm; and the lateral offset of the initial straight portions from the central part is substantially 0.5 mm.

6. A fiber according to claim 2 wherein:

the wire has a constant circular cross-section with a diameter of between 0.8 and 0.15 mm +/− 0.03;

the overall length of the fiber is substantially 50 mm +/− 0.02;

the length of the straight central part is between 38 and 39 mm;

the length of each final straight portion is substantially 1.5 mm;

the length of each initial straight portion with its oblique connecting portions is substantially 4 mm;

the width of the fiber measured in correspondence with its offset end parts is substantially 1.3 mm; and the lateral offset of the initial straight portions from the central part is substantially 0.5 mm.

7. A fiber according to claim 1 wherein the wire is a drawn carbon-steel wire with a minimum tensile strength of 80 kg/mm$^2$.

8. A fiber according to claim 2 wherein the wire is a drawn carbon-steel wire with a minimum tensile of strength of 80 kg/mm$^2$.

9. A metal wire reinforcing fiber comprising:

a central portion that is substantially straight and has a substantially constant circular cross-section; and at least one end portion having first and second straight portions, the first portion being parallel to said central portion, the second portion being coaxial with said central portion, the first straight portion being laterally offset from and connected to said central portion by a first oblique portion, the second straight portion being connected to the first straight portion by a second oblique portion, the first oblique portion being opposed to the second oblique portion.

* * * * *